United States Patent [19]

Kilham

[11] Patent Number: 5,062,388

[45] Date of Patent: * Nov. 5, 1991

[54] BIRD FEEDER

[75] Inventor: Peter Kilham, Foster, R.I.

[73] Assignee: Droll Yankees, Inc., Foster, R.I.

[*] Notice: The portion of the term of this patent subsequent to Dec. 18, 2007 has been disclaimed.

[21] Appl. No.: 622,832

[22] Filed: Dec. 4, 1990

Related U.S. Application Data

[63] Continuation-in-part of Ser. No. 439,236, Nov. 20, 1989, Pat. No. 4,977,859.

[51] Int. Cl.$^5$ ............................................. A01K 39/00
[52] U.S. Cl. ................................................... 119/52.2
[58] Field of Search ............... 119/52.2, 52.1, 51.01, 119/53, 57.8, 57.9; 222/457, 519

[56] References Cited

U.S. PATENT DOCUMENTS

| | | |
|---|---|---|
| 2,796,898 | 6/1957 | Zimmerman ................ 119/52.1 X |
| 2,808,029 | 10/1957 | Geerlings ............................ 119/53 |
| 3,102,511 | 9/1963 | Atcheson ............................ 119/53 |
| 3,645,235 | 2/1972 | Suchza ............................. 119/52.2 |
| 4,889,078 | 12/1989 | Smiley ........................ 119/52.1 X |
| 4,977,859 | 12/1990 | Kilham ............................ 119/52.2 |

Primary Examiner—Gene Mancene
Assistant Examiner—R. Thomas Price
Attorney, Agent, or Firm—Salter & Michaelson

[57] ABSTRACT

Feeder for small birds comprising a transparent cylindrical housing secured at its lower extremity to a metallic ring member having circumferentially spaced feed openings therein, and a metallic tray located below said ring, said tray, ring member and housing being retained in assembled relation by means of a single threaded bolt extending upwardly from beneath said tray.

4 Claims, 2 Drawing Sheets

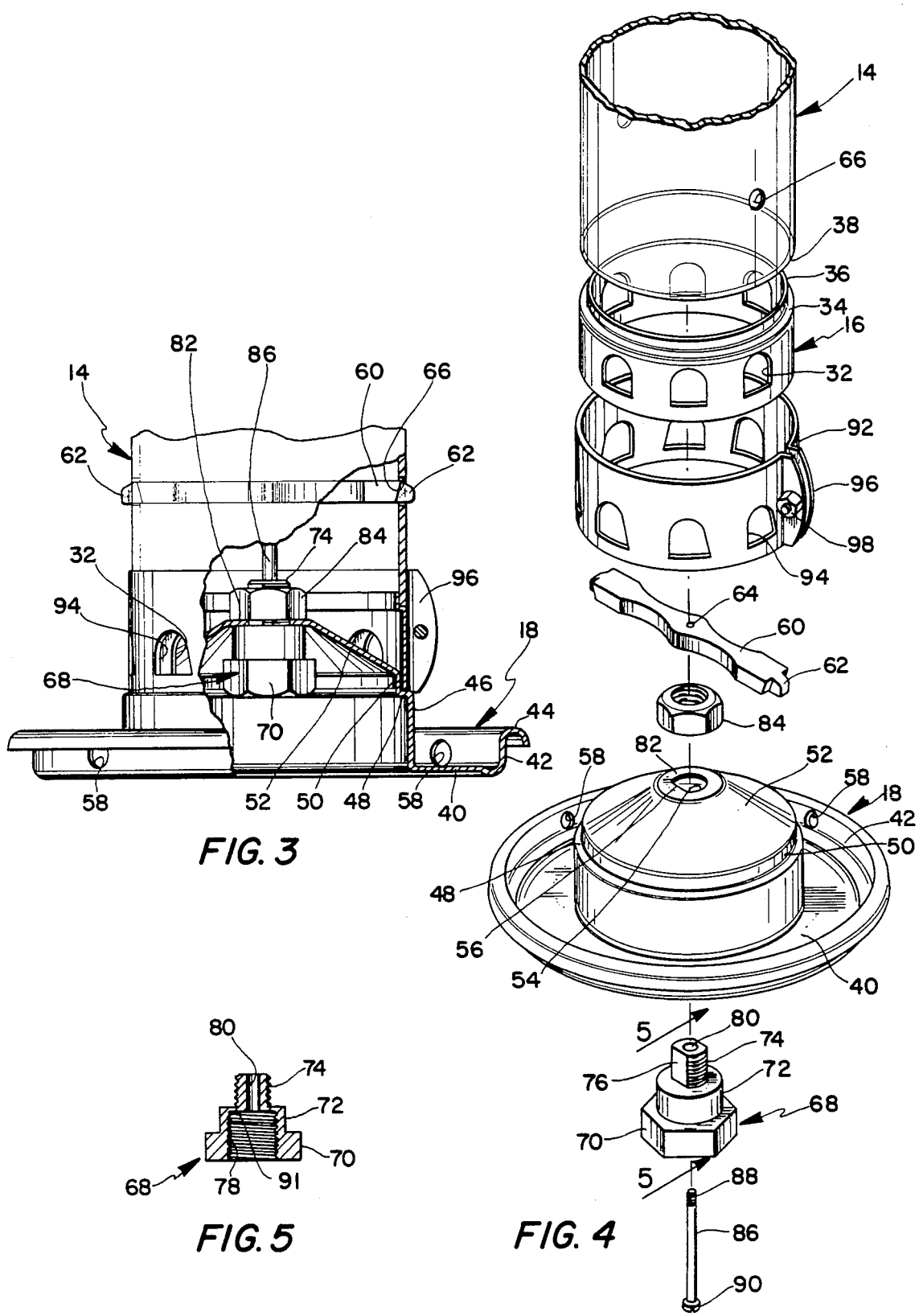

BIRD FEEDER

This application is a continuation-in-part of applicant's co-pending application Ser. No. 07/439,236, filed Nov. 20, 1989, now U.S. Pat. No. 4,977,859.

BACKGROUND OF THE INVENTION

The invention relates to bird feeders, and particularly feeders designed for relatively small birds, such as finches, chickadees, etc.

The instant invention relates to bird feeders of the general type having an elongated, transparent, vertically disposed cylindrical housing preferably constructed of a suitable plastic material, and having adjustable feed ports at the lower extremity thereof, with a peripheral skirt or tray member located beneath the feed ports for collecting seed that spills outwardly through the ports and at the same time for supporting the type of small birds for which this feeder is designed. Feeders of this general type are known in the prior art, but assembly and disassembly of such feeders during cleaning and/or repair frequently is a problem. It is therefore an object of my invention to provide such a feeder wherein the component parts can easily and quickly be assembled and disassembled, such assembly and disassembly requiring no special tools other than an ordinary screwdriver or the like. In fact, assembly and disassembly of the bird feeder of the present invention, not including the top cap or cover thereof, is achieved by manipulating a single screw member, which is easily and conveniently accessible.

SUMMARY OF THE INVENTION

The bird feeder of the present invention comprises three basic components, namely, an elongated cylindrical housing, the lower edge of which is assembled to a circular ring member having a plurality of circumferentially spaced feed apertures therein, the lower edge of said ring member being assembled to a tray assembly comprising a peripheral skirt and a central portion that extends upwardly from the tray assembly into the lower extremity of said ring member so as to close off the bottom of the cylindrical housing. Thus, bird seed that is introduced into the cylindrical housing will pile within the feeder on top of said central portion so as to be accessible to birds perched on the peripheral skirt by extending their beaks through the feed ports into contact with the seed. Actually, the ring member is clamped between the lower edge of the cylindrical housing and a peripheral shoulder provided on the tray assembly, whereby when securing means extending between the tray assembly and the cylindrical housing are tightened to move these members toward each other, the aforesaid ring member is tightly clamped therebetween.

The means for interconnecting the tray assembly and the cylindrical housing comprise a bar or arm that extends diametrically across the housing, said bar having reduced end portions that extend outwardly through diametrically opposed openings in the housing. The bar or arm has a centrally positioned threaded aperture extending therethrough adapted to receive the threaded end of a screw or bolt that extends upwardly through an aligned opening in the central portion of the tray member, the head of said screw or bolt being larger than the opening in the tray member central portion through which it extends, whereby turning of the screw or bolt from underneath, with the threaded end thereof in threaded engagement with the threaded aperture in the bar, causes the tray member and the bar to move toward each other, thus tightly clamping the ring member therebetween.

Another feature of my invention is the manner in which the diametrically extending arm or bar is mounted in the cylindrical housing. Specifically, the housing is made of a flexible plastic material whereby it may be squeezed to an elliptical configuration, the long axis of which is sufficient to receive the bar so that when the latter is aligned with the openings in the housing, and the pressure on the housing is released, it will resume its normal cylindrical configuration with the reduced end of the bar extending outwardly through the diametrically opposed openings in the housing so as to be securely maintained in assembled relation therewith.

It is therefore a primary object of my invention to provide a bird feeder wherein the essential components thereof may be quickly and easily assembled and disassembled without having to use special tools, with the exception of a simple screwdriver.

Another object is the provision of a bird feeder which when once assembled is securely maintained in assembled relation without any appreciable likelihood of inadvertent separation of the parts.

Another object is the provision of a bird feeder that is highly effective for feeding relatively small birds, which is relatively easy to manufacture and assemble, and which is economically feasible.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3 is a section taken on line 3—3 of FIG. 2;

FIG. 4 is an exploded perspective view showing all of the component parts of the bird feeder of the present invention; and FIG. 5 is a section taken on line 5—5 of FIG. 4.

DESCRIPTION OF THE PREFERRED EMBODIMENT OF THE INVENTION

Figures 1, 2:
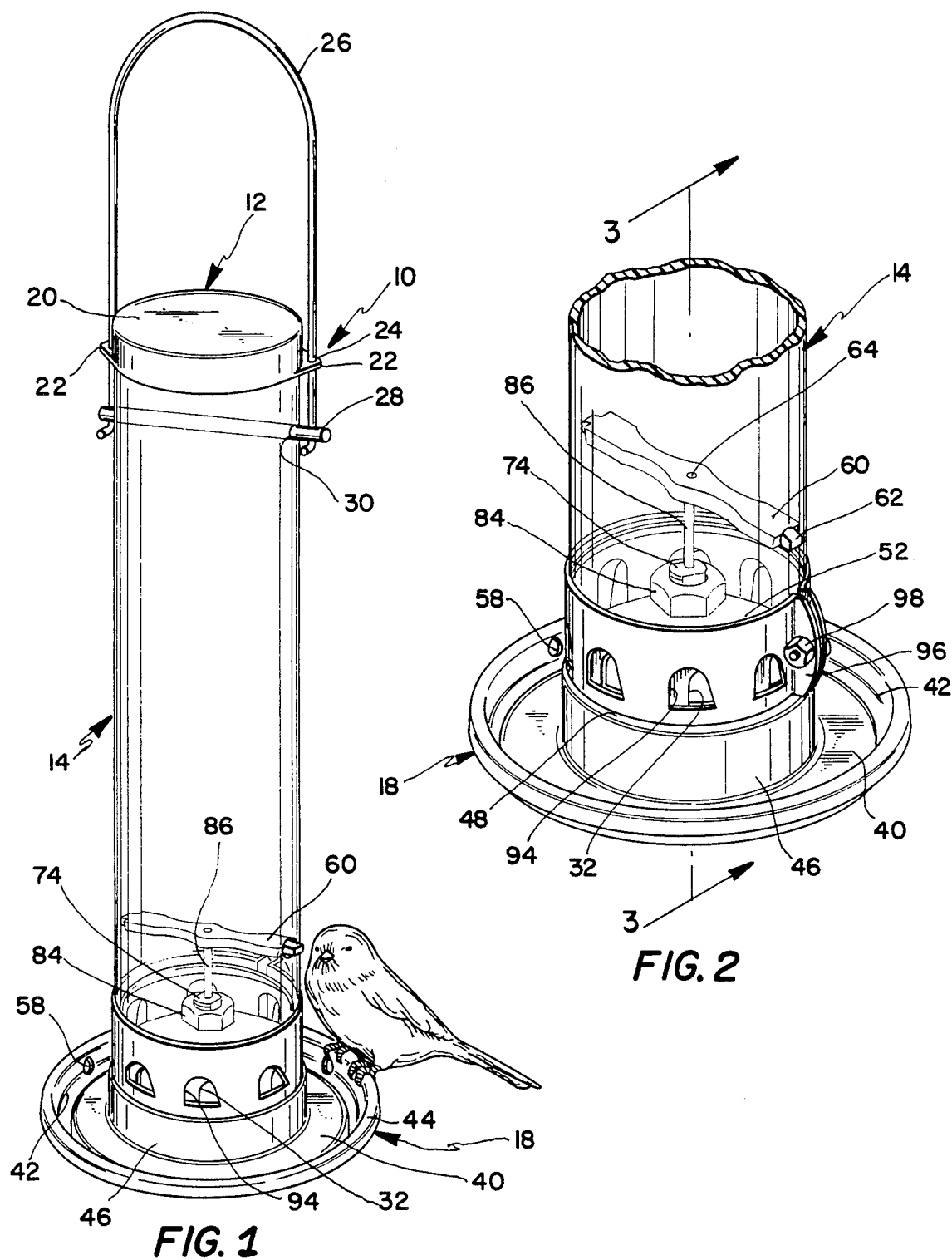
FIG. 1 is a perspective view of the bird feeder of the present invention.
FIG. 2 is an enlarged fragmentary perspective view illustrating the adjustability of the feed apertures.

Referring now to the drawings, and more particularly FIGS. 1 and 4 thereof, there is shown generally at 10 a bird feeder comprising the instant invention consisting of a cover 12, a cylindrical housing 14, a ring member 16, and a tray assembly 18.

The housing 14 is of any suitable transparent or translucent plastic material, such as butyrate, polycarbonate, or the like, and for reasons which will hereinafter become more apparent, housing 14 is sufficiently flexible so that it may be deformed if pressure is applied to opposite wall portions thereof. The cover 12, which is conventional in all respects, comprises a metallic cap 20 which snugly engages the top edge of housing 14, said cap having outwardly extending ear portions 22 on opposite sides thereof having apertures 24 through which a wire hanger 26 extends into engagement with a bar 28 that extends diametrically across housing 14 through suitably provided apertures 30. Thus, when it is desired to gain access to the upper end of the feeder, the cap 20 may be slid upwardly along the wire 26 which may then be swung downwardly to permit unrestricted access to the open top of housing 14 for filling same with bird seed. When the cap 20 is mounted on the upper end of housing 14, as illustrated in FIG. 1, the wire 26 is maintained in its vertical disposition and functions as a hanger for suspending the feeder from a branch or other horizontal support.

Ring member 16 is preferably metallic and is provided with a plurality of circumferentially spaced feed ports or apertures 32 and is further provided with an inwardly extending peripheral shoulder 34 which terminates in an upwardly extending flange 36, it being understood that the diameter of flange 36 is just slightly smaller than the diameter of cylindrical housing 14 wherein the latter can be forced downwardly around said flange until the lower edge 38 of housing 14 abuts the shoulder 34, as shown most clearly in FIG. 3.

The tray assembly 18 is also preferably of metallic construction and comprises a peripheral skirt 40 having an upwardly extending marginal wall 42, the upper edge of which is reversely bent as at 44. Tray assembly 18 further comprises an integral cylindrical center portion 46 having a marginal step or shoulder 48 therein which communicates with a relatively shallow reduced cylindrical portion 50 which in turn merges with a domed wall 52 having a central opening 54 therein, which opening is characterized by a flat or chordal portion 56. A plurality of drain openings 58 are provided in wall 42 to prevent accumulation of excess water in the tray assembly. It is important to note that the diameter of cylindrical portion 50 is just slightly less than the diameter of ring member 16, whereupon the lower edge of the latter may be forced downwardly around said cylindrical portion until it abuts shoulder 48, as shown most clearly in FIG. 3. The domed or slanted wall 52 is advantageous in that it makes the feeder self-cleaning, since damp or rotten seed will not collect as it does in flat-bottomed feeders.

The means for assembling cylindrical housing 14, ring member 16, and tray assembly 18 will now be described. Specifically, an arm or bar 60, preferably metallic, is provided having reduced end portions 62 and a threaded central aperture 64. The length of bar 60, excluding its reduced end portions 62, is approximately equal to the inner diameter of cylindrical housing 14, which housing is provided with diametrically opposed apertures 66 adapted to receive reduced end portions 62. In order to assemble bar 60 to cylindrical housing 14, it is necessary to compress or squeeze the latter to assume an elliptical configuration with the long axis of same aligned with the apertures 66, whereupon when so deformed, sufficient room exists to insert bar 60 until its reduced end portions 62 are in alignment with the opposed openings 66, at which point pressure on the cylindrical housing is released, whereupon it once again assumes its cylindrical configuration with reduced end portions 62 now extending outwardly through apertures 66.

A bolt member shown generally at 68 in FIGS. 4 and 5 comprises a hex portion 70, a rounded washer-like portion 72, and a reduced threaded shaft 74, said threaded shaft having a flat portion 76, whereupon when shaft 74 extends through opening 54, the mating flat portions will prevent relative rotation of bolt member 68 and tray assembly 18. An enlarged threaded bore 78 extends upwardly through portions 70 and 72, said bore communicating with a reduced bore 80 that extends through shaft 74.

In assembling the various components of my bird feeder, the bar 60 is first secured across cylindrical housing 14 as aforedescribed, and then the lower extremity of the cylindrical housing is forced into engagement against shoulder 34. The lower edge of ring member 16 is then forced into engagement against shoulder 48, at which point bolt member 68 is secured to the flat portion 82 that surrounds opening 54 by causing shaft 74 to extend through opening 54, after which a conventional nut 84 is threaded onto shaft 74. At this point a screw member 86, threaded at least at its extremity as at 88, is inserted upwardly through reduced bore 80, it being understood that the diameter of the head portion 90 of the screw member 86 is larger than the diameter of bore 80 so that the head member bears against internal surface 96 in bolt member 68. At the same time, the threaded extremity 88 of screw member 86 threadedly engages the threaded aperture 64 in bar 60, whereupon tightening of screw member 86 causes tray assembly 18 and cylindrical housing 14 to be drawn toward each other with ring member 16 clamped therebetween. Thus, the entire assembly is achieved without the necessity of utilizing any special tools, other than a screwdriver or any other blade for imparting turning movement to screw member 86.

As described in detail in my co-pending application Ser. No. 07/439,236, the size of feed apertures 32 may be adjusted by utilizing an auxiliary ring member 92 having circumferentially spaced feed apertures 94, and further having clamping ears 96 whereby ring member may be positioned so as to extend around the outside of ring member 16 in frictional rotatable relation therewith, the degree of friction being determined by how tight the clamping ears 96 are secured to each other as by a conventional screw and nut assembly 98. By rotating ring 92 with respect to ring 16, the size of the feed apertures may be adjusted to achieve the desired size of the feed openings, it being understood that where small seed, such as thistle seed, is being used, a smaller opening may be desired, while if a larger seed is being used, such as sunflower seed, then the openings could be adjusted to a larger or completely open size.

The size of peripheral skirt 40 is such that small birds, such as finches, chickadees and the like, can perch themselves on the top of wall 42 and conveniently insert their beaks through the feed openings, as illustrated in FIG. 1. However, larger birds, such as cardinals, for example, are not able to conveniently perch themselves on wall 42 and extend their beaks through the feed apertures.

If the feeder 10 is to be post-mounted, rather than suspended by means of hanger 26, any suitable threaded post (not shown) would be mounted vertically in the ground, with the upper end of said post threadedly receiving internal threads 78 of bolt member 68, as is well known in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder comprising a vertically disposed cylindrical housing having upper and lower ends, a ring member of substantially the same diameter as said housing positioned at the lower end thereof, said ring member having upper and lower extremities, a plurality of circumferentially spaced feed apertures in said ring member, a tray member having a peripheral skirt extending outwardly adjacent the lower extremity of said ring member, said tray member having a wall portion that closes off the bottom of said feeder, and means for securing said housing, ring member and tray member in assembled relation, said securing means comprising a locking arm extending diametrically across said housing and being secured thereto in spaced relation above said bottom, a threaded hole extending through said locking bar at approximately the midpoint thereof, a central opening in said bottom, and an elongated screw member extending upwardly through said opening into threaded engagement with said hole, whereby tightening of said screw secures said tray member to said housing, with said ring member clamped therebetween.

2. In the feeder of claim 1, the opening in said bottom wall being substantially larger than the diameter of said screw member and having a non-round configuration, an enlarged hollow bolt having a reduced threaded shaft of substantially the same non-round configuration extending through said opening so as to be nonrotatable with respect to said bottom wall, a threaded nut engaging said shaft above said wall to tightly secure said enlarged bolt to said wall, and a bore extending axially through said shaft through which said screw member extends.

3. In the feeder of claim 1, said housing being sufficiently flexible so that it can be squeezed into an elliptical cross-sectional shape, said locking bar being slightly longer than the diameter of said housing and having reduced end portions, a pair of diametrically opposed apertures in said housing adapted to receive said reduced end portions, said locking bar being capable of assembly to said housing by squeezing the latter so as to provide sufficient space for said bar to be inserted into said housing so that it extends thereacross in alignment with said opposed apertures, whereby release of pressure on said housing causes it to assume its normal cylindrical configuration, with said reduced end portions extending outwardly through said opposed apertures.

4. In the feeder of claim 1, said ring member having an inwardly extending peripheral shoulder adjacent its upper extremity, the lower end of said housing abutting against said shoulder, and said wall portion having a peripheral shoulder on which the lower extremity of said ring member sits.

* * * * *